United States Patent
Su et al.

(10) Patent No.: US 9,471,542 B2
(45) Date of Patent: Oct. 18, 2016

(54) PARAMETER GENERATING DEVICE AND METHOD

(71) Applicant: REALTEK SEMICONDUCTOR CORPORATION, Hsinchu (TW)

(72) Inventors: Ching-Yao Su, Taichung (TW); Liang-Wei Huang, Hsinchu (TW); Shih-Wei Wang, Pingtung County (TW); Wan-Chun Huang, Tainan (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 258 days.

(21) Appl. No.: 14/323,411

(22) Filed: Jul. 3, 2014

(65) Prior Publication Data
US 2015/0052181 A1 Feb. 19, 2015

(30) Foreign Application Priority Data
Aug. 13, 2013 (TW) .............................. 102129069 A

(51) Int. Cl.
*G06F 17/10* (2006.01)
*G06F 7/50* (2006.01)
*G06F 17/13* (2006.01)
*G06F 7/64* (2006.01)

(52) U.S. Cl.
CPC ..................... *G06F 17/10* (2013.01)

(58) Field of Classification Search
CPC .................................................... G05B 13/042
See application file for complete search history.

(56) References Cited

U.S. PATENT DOCUMENTS 7,979,219 B2  7/2011 Yen et al.

OTHER PUBLICATIONS

Wikipedia, Euler Method, Mar. 8, 2012, pp. 1-7.*
James C. Robinson, "An Introduction to Ordinary Differential Equations," 2004, p. 201-212.

* cited by examiner

*Primary Examiner* — Andrew Caldwell
*Assistant Examiner* — Calvin M Brien
(74) *Attorney, Agent, or Firm* — WPAT, P.C., Intellectual Property Attorneys; Anthony King

(57) ABSTRACT

The present invention discloses a parameter generating device and the method thereof to generate a parameter for circuit operation in which the parameter corresponds to an N degree polynomial of a characteristic curve while said N is a positive integer. The parameter generating device comprises: a storage circuit to store at least N+1 initial values that are determined by a start value and a unit variation amount; and a parameter calculating circuit, coupled to the storage circuit, to carry out addition calculation for at least [(K−1)×N+1] time(s) if a multiple K is positive or subtraction calculation for at least −K×N time(s) if the multiple K is negative, so as to generate the aforementioned parameter, wherein the multiple K is derived from a difference divided by the unit variation amount while the difference is a current value minus the start value.

16 Claims, 8 Drawing Sheets

PARAMETER GENERATING DEVICE AND METHOD

BACKGROUND OF THE INVENTION

1. Field of the Invention

The present invention relates to a parameter generating device and method, especially to a parameter generating device and method capable of generating parameters through addition or subtraction calculation.

2. Description of Related Art

Generally speaking, a circuit needs some predetermined parameters for operation to achieve the performance conforming to expectation. However, as an external condition (e.g. environment temperature) or an internal condition (e.g. operating voltage) changes, these predetermined parameters may become inappropriate, which means that if the circuit keeps working with these parameters, it may not be able to achieve the expected performance. Therefore, once an external or internal condition changes, the circuit has to acquire the update of the parameters or modify the existing parameters to maintain the performance. According to a prior art, the circuit can use a mapping table to store a plurality of parameters in connection with one or more variant conditions and then acquire a proper parameter from the mapping table according to the current state of the variant condition(s). Since the variant condition (e.g. temperature) usually varies continuously, if the parameter is required to be accurate under the variant condition, the mapping table has to store a huge amount of parameters and will become enormous and consume a lot of memory; or the mapping table may only store a few amount of parameters provided that the circuit has to carry out an approximation calculation (e.g. interpolation calculation) with the existing parameters to obtain new parameters for a following procedure in which said approximation calculation will consume the operation resource of the circuit and the new parameters are relatively inaccurate, which are not favorable.

Those who are interested in more detail of the prior art may refer to the U.S. Pat. No. 7,979,219.

SUMMARY OF THE INVENTION

In consideration of the problems of the prior art, an object of the present invention is to provide a parameter generating device and method capable of improving the prior art.

Another object of the present invention is to provide a parameter generating device and method capable of generating a parameter through addition or subtraction calculation and thereby simplifying the process of generating parameters.

The present invention discloses a parameter generating device operable to generate a parameter for circuit operation in which the parameter is associated with an N degree polynomial of a characteristic curve while the N is a positive integer. An embodiment of the parameter generating device comprises: a storage circuit operable to store at least N+1 initial values which are determined in accordance with a start value and a unit variation amount; and a parameter calculating circuit, coupled to the storage circuit, operable to carry out addition calculation for at least $[(K-1) \times N+1]$ time(s) if a multiple K is positive or subtraction calculation for at least $-K \times N$ time(s) if the multiple K is negative, so as to generate the parameter, wherein the multiple K is derived from a difference divided by the unit variation amount while the difference is a current value minus the start value.

The present invention also discloses a parameter generating method carried out by the parameter generating device of the present invention or its equivalent and operable to generate a parameter for circuit operation in which the parameter is associated with an N degree polynomial of a characteristic curve while the N is a positive integer. An embodiment of the parameter generating method comprises the following steps: providing at least N+1 initial values which are determined in accordance with a start value and a unit variation amount; and executing addition calculation for at least $[(K-1) \times N+1]$ time(s) if a multiple K is positive or subtraction calculation for at least $-K \times N$ time(s) if the multiple K is negative, so as to generate the parameter, wherein the multiple K is derived from a difference divided by the unit variation amount while the difference is a current value minus the start value.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
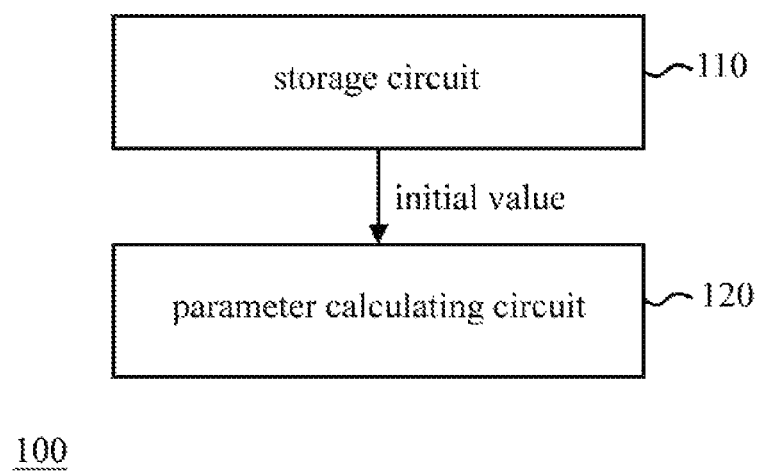
FIG. 1 illustrates an embodiment of the parameter generating device of the present invention.

The following description is written by referring to terms of this invention field. If any term is defined in the specification, such term should be explained accordingly. Besides, the connection between objects or events in the disclosed embodiments can be direct or indirect provided that these embodiments are still applicable under such connection. Said "indirect" means that an intermediate object or a physical space is existed between the objects, or an intermediate event or a time interval is existed between the events.

The present invention comprises a parameter generating device and method capable of generating a parameter for circuit operation. In order to generate the parameter, the present invention adopts Modified Euler's Method to thereby obtain the correct value of an N degree polynomial f(x) through addition or subtraction calculation. The theory and derivation of Euler's Method can be found in the following public reference: James C. Robinson, "AN INTRODUCTION TO ORDINARY DIFFERENTIAL EQUATION", p. 201-212, Cambridge University Press, ISBN-10: 0511801203, ISBN-13: 978-0511801204. The Modified Euler's Method is explained in the following paragraphs.

Assuming that f(x) represents an N degree polynomial $(f(x)=a_n x^n + a_{n-1} x^{n-1} + \ldots + a_1 x + a_0)$ to be approached, according to the principle of differentiation, the following differential functions (tangent functions) can be derived:

$$f'(x) = \lim_{\Delta x \to 0} \frac{f(x+\Delta x) - f(x)}{\Delta x} = na_n x^{n-1} + (n-1)a_{n-1} x^{n-2} + \ldots + 2a_2 x + a_1$$

$$f''(x) = \lim_{\Delta x \to 0} \frac{f'(x+\Delta x) - f'(x)}{\Delta x} =$$
$$n(n-1)a_n x^{n-2} + (n-1)(n-2)a_{n-1} x^{n-3} + \ldots + 2a_2$$
$$\vdots$$
$$f^{(n)}(x) = \lim_{\Delta x \to 0} \frac{f^{(n-1)}(x+\Delta x) - f^{(n-1)}(x)}{\Delta x} = n! \cdot a_n \text{ (constant)}$$

In light of the above-listed functions, since the N-order differential $f^{(n)}(x)$ of the N degree polynomial is a constant, if we turn to secant functions instead of these tangent functions under a unit variation amount $\Delta x$, similar equations could be derived as follows:

$$\tilde{f}'(x) = f(x+\Delta x) - f(x) = g_1(x)$$
$$\tilde{f}''(x) = \tilde{f}'(x+\Delta x) - \tilde{f}'(x) = g_2(x)$$
$$\vdots$$
$$\tilde{f}^{(n)}(x) = \tilde{f}^{(n-1)}(x+\Delta x) - \tilde{f}^{(n-1)}(x) = n! \cdot a_n \Delta x^n \text{ (constant)}$$

After rearranging the above-listed equations, a set of recursive equations is obtained as follows:

$$\begin{cases} f(x+\Delta x) = f(x) + \tilde{f}'(x) \\ \tilde{f}'(x+\Delta x) = \tilde{f}'(x) + \tilde{f}''(x) \\ \vdots \\ \tilde{f}^{(n-1)}(x+\Delta x) = \tilde{f}^{(n-1)}(x) + \tilde{f}^{(n)}(x) = \tilde{f}^{(n-1)}(x) + n! \cdot a_n \Delta x^n \end{cases}$$

According to the above discussion, for instance, if the N degree polynomial is a 3 degree polynomial $f(x)=a_3 x^3 + a_2 x^2 + a_1 x + a_0$, the secant functions thereof can be derived as follows:

$$\tilde{f}'(x) = f(x+\Delta x) - f(x) = 3a_3 \Delta x \cdot x^2 + (3a_3 \Delta x^2 + 2a_2 \Delta x)x + (a_3 \Delta x^3 + a_2 \Delta x^2 + a_1 \Delta x)$$

$$\tilde{f}''(x) = \tilde{f}'(x+\Delta x) - \tilde{f}'(x) = 6a_3 \Delta x^2 \cdot x + (6a_3 \Delta x^3 + 2a_2 \Delta x^2)$$

$$\tilde{f}'''(x) = \tilde{f}''(x+\Delta x) - \tilde{f}''(x) = 6a_3 \Delta x^3 \quad \text{(constant)}$$

After rearranging the above-listed functions, a set of recursive equations is therefore obtained as follows:

$$\begin{cases} f(x+\Delta x) = f(x) + \tilde{f}'(x) \\ \tilde{f}'(x+\Delta x) = \tilde{f}'(x) + \tilde{f}''(x) \\ \tilde{f}''(x+\Delta x) = \tilde{f}''(x) + \tilde{f}'''(x) = \tilde{f}''(x) + 6a_3 \Delta x^3 \end{cases}$$

Consequently, if the start value $x_0$ of this 3 degree polynomial $f(x)=a_3 x^3 + a_2 x^2 + a_1 x + a_0$ is known, provided that $(3+1)=4$ initial values $\{f(x_0)=a_3 x_0^3 + a_2 x_0^2 + a_1 x_0 + a_0;\ \tilde{f}'(x_0) = 3a_3 \Delta x \cdot x_0^2 + (3a_3 \Delta x^2 + 2a_2 \Delta x)x_0 + (a_3 \Delta x^3 + a_2 \Delta x^2 + a_1 \Delta x);\ \tilde{f}''(x_0) = 6a_3 \Delta x^2 \cdot x_0 + (6a_3 \Delta x^3 + 2a_2 \Delta x^2);\ \tilde{f}'''(x_0) = 6a_3 \Delta x^3\}$ has been obtained according to the 3 degree polynomial and the start value $x_0$ in advance, the aforementioned recursive equations can therefore be used to calculate the value $f(x_0 + k \cdot \Delta x)$ of the polynomial through addition calculation in which the variant k is an integer. To be more specific; assuming that the 3 degree polynomial is $f(x)=x^3 + 12x^2 + 3x + 4$ (that is to say $a_3=1;\ a_2=12;\ a_1=3;\ a_0=4$) and the start value $x_0$ is 0, the four initial values $f(x_0),\ \tilde{f}'(x_0),\ \tilde{f}''(x_0),\ \tilde{f}'''(x_0)$ can be derived as 4, 16, 30, 6 respectively; meanwhile, if the unit variation amount $\Delta x$ is 1, the value $f(x_0 + k \cdot \Delta x)$ of the polynomial can be found through addition calculation as it is explained in the aforementioned description, which is also illustrated in table 1 below.

TABLE 1

| $x_0 = 0;\ \Delta x = 1$ | $f(x_0) = 4$ | $\tilde{f}'(x_0) = 16$ | $\tilde{f}''(x_0) = 30$ | $\tilde{f}'''(x_0) = 6$ | $f(x_0 + k \cdot \Delta x)$ 公式解 |
|---|---|---|---|---|---|
| $f(x_0 + 1 \cdot \Delta x)$ | 20 | 46 | 36 | 6 | 20 |
|  | $(f(x_0) + \tilde{f}'(x_0))$ | $(\tilde{f}'(x_0) + \tilde{f}''(x_0))$ | $(\tilde{f}''(x_0) + \tilde{f}'''(x_0))$ |  |  |
| $f(x_0 + 2 \cdot \Delta x)$ | 66 | 82 | 42 | 6 | 66 |
|  | (20 + 46) | (46 + 36) | (36 + 6) |  |  |
| $f(x_0 + 3 \cdot \Delta x)$ | 148 | 124 | 48 | 6 | 148 |
|  | (66 + 82) | (82 + 42) | (42 + 6) |  |  |
| $f(x_0 + 4 \cdot \Delta x)$ | 272 | 172 | 54 | 6 | 272 |
| $f(x_0 + 5 \cdot \Delta x)$ | 444 | 226 | 60 | 6 | 444 |
| $f(x_0 + 6 \cdot \Delta x)$ | 670 | 286 | 66 | 6 | 670 |
| $f(x_0 + 7 \cdot \Delta x)$ | 956 | 352 | 72 | 6 | 956 |
| $f(x_0 + 8 \cdot \Delta x)$ | 1308 | 424 | 78 | 6 | 1308 |
| $f(x_0 + 9 \cdot \Delta x)$ | 1732 | 502 | 84 | 6 | 1732 |
| $f(x_0 + 10 \cdot \Delta x)$ | 2234 | 586 | 90 | 6 | 2234 |
| so on and so forth | so on and so forth | so on and so forth | so on and so forth | so on and so forth |  |

Accordingly, based on the set of recursive equations, if a start value $x_0$ (a.k.a. basis value) of an N degree polynomial $f(x)=a_n x^n + a_{n-1} x^{n-1} + \ldots + a_1 x + a_0$ is known and N+1 initial values $\{f(x_0),\ \tilde{f}'(x_0),\ \tilde{f}''(x_0),\ \ldots,\ \tilde{f}^{(n-1)}(x_0),\ \tilde{f}^{(n)}(x_0)\}$ are determined with the polynomial and the start value $x_0$ in advance, one can find the value of $f(x_0 + k \cdot \Delta x)$ through the set of recursive equations in the manner of addition in which the variable k is an integer.

According to table 1, any $f(x_0 + k \cdot \Delta x)$ can be derived from the four initial values $f(x_0),\ \tilde{f}'(x_0),\ \tilde{f}''(x_0),\ \tilde{f}'''(x_0)$ through pure addition calculation, and the derived value will be exactly the same as those obtained through formula calculation. For instance, if one is going to find f(3), all she/he needs to do is executing addition calculation with the four initial values for 7 times and taking the last one (i.e. 148) among the 7 addition values 20, 46, 36, 66, 82, 42 and 148 as f(3).

Please note that the start value $x_0$ could be some value other than 0. For instance, if the unit variation amount $\Delta x$ remains unchanged (i.e. $\Delta x=1$) but the start value $x_0$ is 3 (equivalent to the foresaid start value $x_0=0$ plus $3\Delta x$, i.e. $0+3=3$), one can find the four initial values 148, 124, 48, 6 (in connection with $f(x_0+3\cdot\Delta x)$ as illustrated in table 1) through any available calculation manner in advance, or can derive the four latest initial values 148, 124, 48, 6 from some existing initial values such as 4, 16, 30, 6 by addition calculation or from some existing initial values such as 272, 172, 54, 6 by subtraction calculation (i.e. one of the four latest initial values is the 3-order differential 6 which is constant, and the other three latest initial values can be derived as follows: $54-6=48$, $172-48=124$, $272-124=148$). On the other hand, please also note that the unit variation amount $\Delta x$ could be some amount other than 1. For instance, if the amount $\Delta x$ is 2 while the start value $x_0$ is 0, the four initial values $\{f(x_0)=a_3x_0^3+a_2x_0^2+a_1x_0+a_0; \tilde{f}(x)=3a_3\Delta x \cdot x_0^2+(3a_3\Delta x^2+2a_2\Delta x)x_0+(a_3\Delta x^3+a_2\Delta x^2+a_1\Delta x); \tilde{f}''(x)=6a_3\Delta x^2 \cdot x_0+(6a_3\Delta x^3+2a_2\Delta x^2); \tilde{f}'''(x)=6a_3\Delta x^3\}$ will be 4, 62, 144, 48 correspondingly, and then the value of $f(x_0+k\cdot\Delta x)$ can then be derived from the four initial values.

In light of the described Modified Euler's Method, Applicant provides a parameter generating device and method capable of simplifying the process of generating a parameter. Please refer to FIG. 1 which illustrates an embodiment of the parameter generating device of the present invention. This embodiment is able to generate a parameter through addition or subtraction calculation for circuit operation in which the parameter is related to an N degree polynomial of a characteristic curve while the N is a positive integer. As it is shown in FIG. 1, the parameter generating device 100 comprises: a storage circuit 110 operable to store at least N+1 initial values which are determined in accordance with a start value $x_0$ and a unit variation amount $\Delta x$; and a parameter calculating circuit 120, coupled to the storage circuit 110, operable to carry out addition calculation for at least $[(K-1)\times N+1]$ time(s) if a multiple K is positive or subtraction calculation for at least $-K\times N$ time(s) if the multiple K is negative, so as to generate the parameter, wherein the multiple K is derived from a difference divided by the unit variation amount $\Delta x$ while the difference is a current value x minus the start value $x_0$. For instance, said N degree polynomial is a 3 degree polynomial $f(x)=a_3x^3+a_2x^2+a_1x+a_0$. Since the polynomial degree N is 3, the N+1 initial values are $3+1=4$ initial values $f(x_0)$, $\tilde{f}(x_0)$, $\tilde{f}''(x_0)$, $\tilde{f}'''(x_0)$, and the parameter to be generated is the value of $f(x)=f(x_0+k\cdot\Delta x)$ derived from the addition calculation for $[(K-1)\times N+1]$ time(s), or the value of $f(x)=f(x_0+k\cdot\Delta x)$ derived from the subtraction calculation for $-K\times N$ time(s) in which the variable k is an integer. Please note that the start value $x_0$ and the unit variation amount $\Delta x$ could be stored in the storage circuit 110 or some other circuit (e.g. another storage circuit); the current value x could be determined by an asking end (i.e. any software/firmware and/or hardware asking for the parameter; for instance an equalizer control circuit); the value of $[(K-1)\times N+1]$ or $-K\times N$ could be calculated by any appropriate software/firmware and/or hardware (e.g. a circuit composed of addition/subtraction unit(s) and multiplication unit(s)); and the execution sequence of the $[(K-1)\times N+1]$ time(s) addition calculation or $-K\times N$ time(s) subtraction calculation could be controlled through any appropriate software/firmware and/or hardware (e.g. a finite state machine) which may be integrated in the parameter calculating circuit 120 or independent of it, so that the parameter calculating circuit 120 is able to execute the addition or subtraction calculation by a proper order. Please also note that the parameter generating circuit 120 could be equipped with only the addition or subtraction function for simplification; but it can be equipped with both the functions undoubtedly.

Please refer to table 1 and FIG. 1. Assuming that the N degree polynomial is the 3 degree polynomial $f(x)=x^3+12x^2+3x+4$ as it is used in table 1, the start value $x_0$ is 0 and the unit variation amount $\Delta x$ is 1, the storage circuit 110 is then supposed to store the four initial values 4, 16, 30 and 6. Accordingly, if the parameter generating device 100 is going to generate a parameter f(1), which implies that the aforementioned current value x is 1, since the multiple K is 1 (which is derived from the difference between the current value x and the start value $x_0$ (i.e. $x-x_0$) divided by the unit variation amount $\Delta x$), the parameter calculating circuit 120 will carry out addition calculation according to the four initial values for at least one time to thereby generate an addition value 20, that is to say the desired parameter f(1). More specifically, the N+1 (i.e. $3+1=4$ in the present example) initial values comply with a sequence (i.e. the order of the queue 4, 16, 30, 6) and the addition calculation for $[(K-1)\times N+1]$ time(s) (i.e. $[(1-1)\times 3+1]=1$ time) includes a calculation of adding a $M^{th}$ initial value (i.e. the first initial value 4 in this example) and a $(M+1)^{th}$ initial value (i.e. the second initial value 16 in this example) of the N+1 initial values (i.e. the four initial values 4, 16, 30, 6) up according to the sequence to thereby generate the parameter (i.e. $4+16=20$) in which the M is a positive integer less than the N. Similarly, under the same assumption, if the start value $x_0$ is 2 instead, the storage circuit 100 will store the four initial values 66, 82, 42, 6. Accordingly, if the parameter generating device 100 is going to generate a parameter f(1), since the multiple K is $-1$ (which is derived from the difference between the current value x and the start value $x_0$ (i.e. $x-x_0$) divided by the unit variation amount $\Delta x$), the parameter calculating circuit 120 will carry out subtraction calculation according to the four initial values for at least three time to thereby generate a subtraction value 20, that is to say the desired parameter f(1). The four initial values comply with a sequence (i.e. the order of the queue 66, 82, 42, 6) and the subtraction calculation for $-K\times N$ time(s) (i.e. $[-(-1)\times 3]=3$ times) includes: a first calculation of subtracting a $(N+1)^{th}$ initial value (i.e. the fourth initial value 6 in this example) from a $N^{th}$ initial value (i.e. the third initial value 42 in this example) according to the sequence; a second calculation of subtracting the first calculation result (i.e. $42-6=36$) from the second initial value (i.e. 82); and a third calculation of subtracting the second calculation result (i.e. $82-36=46$) from the first initial value (i.e. 66), so as to get the parameter $f(1)=66-46=20$.

Please refer to table 1 and FIG. 1 again. Under the assumption described in the preceding paragraph (i.e. $x_0=0$ and $\Delta x=1$), if the parameter generating device 100 is going to generate a parameter f(2) which implies that the current value x is 2, since the multiple K is 2 (which is derived from the difference between the current value x and the start value $x_0$ (i.e. $x-x_0=2-0=2$) divided by the unit variation amount $\Delta x=1$), the parameter calculating circuit 120 will carry out addition calculation according to the foresaid four initial values (i.e. 4, 16, 30 and 6) for at least four times (i.e. $[(K-1)\times N+1]=[(2-1)\times 3+1]=4$) to thereby generate addition values 20, 46, 36 and 66 among which the last one (i.e. 66) is the desired parameter f(2). In a general case, if the K is equal to or more than 2, the parameter calculating circuit 120 will carry out addition calculation for N time(s) (e.g. 3 times in the above-mentioned example) according to the N+1 initial values (e.g. 4 initial values 4, 16, 30 and 6 in the above-mentioned example) to thereby generate N first addition values (e.g. 3 first addition values 4+16=20, 16+30=46, 30+6=36 in the above-mentioned example), and then carry out addition calculation for [(K−2)×N+1] time(s) (e.g. [(2−2)×3+1]=1 time in the above-mentioned example) according to the N first addition values and a $(N+1)^{th}$ initial value (e.g. 6 in the above-mentioned example) of the N+1 initial values to thereby generate the wanted parameter $f(x)=f(x_0+k·\Delta x)$ (e.g. $f(2)=f(0+2·1)=20+46=66$ in the above-mentioned example). In other words, the parameter calculating circuit 120 will add any adjacent two of the N+1 initial values up according to the sequence of the N+1 initial values to generate the N first addition values, and then carry out the rest of the addition calculation according to the N first addition values and the $(N+1)^{th}$ initial value to get the parameter. Similarly, under an assumption that the start value $x_0$ is 4 instead, the unit variation amount $\Delta x$ is 1 and the storage circuit 110 stores the four initial values 272, 172, 54, 6, if the parameter generating device 100 is going to generate a parameter f(2) which implies that the current value x is 2, since the multiple K is −2 (which is derived from the difference between the current value x=2 and the start value $x_0=4$ (i.e. $x-x_0=2-4=-2$) divided by the unit variation amount $\Delta x=1$), the parameter calculating circuit 120 will carry out subtraction calculation according to the four initial values for at least six times (i.e. −K×N=−(−2)×3=6 times) to thereby generate subtraction values 48, 124, 148, 42, 82 and 66 among which the last one (i.e. 66) is the desired parameter f(2). In a general case, if the K is equal to or more than −2, the parameter calculating circuit 120 will carry out subtraction calculation for N time(s) (e.g. 3 times in the above-mentioned example) according to the N+1 initial values (e.g. 4 initial values 272, 172, 54, 6 in the above-mentioned example) to thereby generate N first subtraction values (e.g. 3 first subtraction values 54−6=48, 172−48=124, 272−124=148 in the above-mentioned example), and then carry out subtraction calculation for (−K−1)×N time(s) (e.g. [−(−2)−1]×3=3 times in the above-mentioned example) according to the N first subtraction values and the $(N+1)^{th}$ initial value (e.g. the constant 6) to thereby generate the parameter f(2). In other words, the parameter calculating circuit 120 will subtract the $(N+1)^{th}$ initial value from a $N^{th}$ initial value of the N+1 initial values to generate a $N^{th}$ first subtraction value of the N first subtraction values (e.g. 54−6=48 in the above-mentioned example), and then subtract a $(M+1)^{th}$ first subtraction value of the N first subtraction values from a $M^{th}$ initial value of the N+1 initial values to thereby generate the rest of the N first subtraction values (e.g. 172−48=124, 272−124=148 in the above-mentioned example) in which the M is an integer from N−1 to 1 and the N first subtraction values also comply with the sequence of the initial values.

Please refer to table 1 and FIG. 1 once more. Under the same assumption of the preceding paragraph, that is to say the start value $x_0=0$ and the unit variation amount $\Delta x=1$, if the parameter generating device 100 is going to generate a parameter f(3) which implies that the current value x is 3, since the multiple K is 3 (which is derived from the difference (i.e. $x-x_0$) divided by the unit variation amount $\Delta x$), the parameter calculating circuit 120 will carry out addition calculation according to the four initial values (i.e. 4, 16, 30 and 6) for at least seven times (i.e. (i.e. [(K−1)×N+1]=[(3−1)×3+1]=7) to thereby generate addition values 20, 46, 36, 66, 82, 42 and 148 among which the last one (i.e. 148) is the desired parameter f(3). In a general case, if the K is equal to or more than 3, the parameter calculating circuit 120 will carry out addition calculation for N time(s) (e.g. 3 times in the above-mentioned example) according to the N+1 initial values (e.g. 4 initial values 4, 16, 30, 6 in the above-mentioned example) to thereby generate N first addition values (e.g. 3 first addition values 4+16=20, 16+30=46, 30+6=36 in the above-mentioned example) which comply with the sequence of the initial values, then add any adjacent two of the N first addition values up and add the $N^{th}$ first addition value (e.g. 36 in the above-mentioned example) and the $(N+1)^{th}$ initial value (e.g. 6 in the above-mentioned example) up to thereby generate N second addition values (i.e. 20+46=66, 46+36=82, 36+6=42 in the above-mentioned example), and afterwards carry out addition calculation for [(K−3)×N+1] time(s) (e.g. [(3−3)×3+1]=1 time in the above-mentioned example) according to the N second addition values and the N+1 initial value to thereby generate the wanted parameter f(3) f(0+3·1)=66+82=148. Similarly, under an assumption that the start value $x_0$ is 6 instead, the unit variation amount $\Delta x$ is 1 and the storage circuit 110 stores the four initial values 670, 286, 66 and 6, if the parameter generating device 100 is going to generate a parameter f(3) which implies that the current value x is 3, since the multiple K is −3 (which is derived from the difference (i.e. $x-x_0=3-6=-3$) divided by the unit variation amount $\Delta x=1$), the parameter calculating circuit 120 will carry out subtraction calculation according to the four initial values for at least nine times (i.e. −K×N=−(−3)×3=9 times) to thereby generate subtraction values 60, 226, 444, 54, 172, 272, 48, 124 and 148 among which the last one (i.e. 148) is the desired parameter f(3). In a general case, if the K is equal to or less than −3, the parameter calculating circuit 120 will carry out subtraction calculation for N time(s) (e.g. 3 times in the foresaid example) according to the N+1 initial values (e.g. 4 initial values 670, 286, 66, 6 in the foresaid example) to thereby generate N first subtraction values (e.g. 3 first subtraction values 444, 226, 60 in the foresaid example), then subtract the $(N+1)^{th}$ initial value from the $N^{th}$ first subtraction value to generate a $N^{th}$ second subtraction value (e.g. 60−6=54 in the foresaid example) of N second subtraction values which also comply with the sequence of the initial values, afterwards subtract a $(M+1)^{th}$ second subtraction value of the N second subtraction values from a $M^{th}$ first subtraction value of the N first subtraction values to generate the rest of the N second subtraction values (e.g. 226−54=172, 444−172=272 in the foresaid example) in which the M is an integer from N−1 to 1, and finally execute subtraction calculation for (−K−2)×N time(s) (i.e. [−(−3)−2]×3=3 times in this case) according to the N second subtraction values and the $(N+1)^{th}$ initial value to generate the wanted parameter f(3).

Please note that since people of ordinary skill in the art can derive more examples from the fore-disclosed description by themselves, repeated or redundant explanation is therefore omitted.

Figure 2:
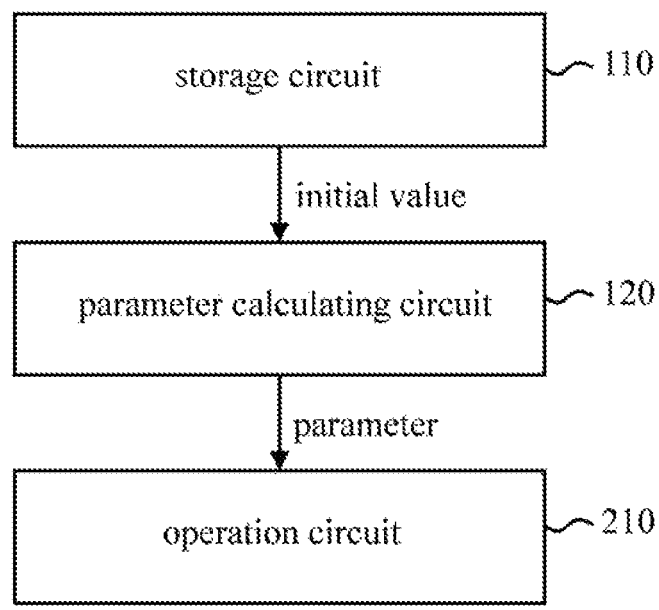
FIG. 2 illustrates another embodiment of the parameter generating device of the present invention.

The description above is true provided that the N degree polynomial of a concerned characteristic curve is correct. However, the change of an external or internal condition may cause the N degree polynomial incapable of reflecting the characteristic curve under the changed condition, or the existing N degree polynomial may not directly relate to an interested characteristic curve in connection with a target parameter an asking end asks for; in the meantime, the existing N degree polynomial will not be able to represent the changed or some interested characteristic curve, but an unknown target polynomial will. Therefore, the present invention further discloses a parameter generating device 200 as shown in FIG. 2. Compared with FIG. 1, the parameter generating device 200 further comprises: an operation circuit 210, coupled with the parameter calculating circuit 120, operable to approximate the existing N degree polynomial to a target polynomial according to a correlation between them and obtain each coefficient of the correlation when the two polynomials get close. After the coefficient(s) of the correlation has been found, the operation circuit 210 is then able to calculate a target parameter of the target polynomial according to the correlation and the parameter from the parameter calculating circuit 120. For instance, if the existing N degree polynomial is $f_1(x)=a_3x^3+a_2x^2+a_1x+a_0$ while the target polynomial is $f_2(x)=b_3x^3+b_2x^2+b_1x+b_0$, the operation circuit 210 can derive the coefficients c and d of a hypothetical linear equation $f_3(x)=c\cdot f_1(x)+d$ given that the polynomial $f_3(x)$ approximates to the polynomial $f_2(x)$. The operation circuit 210 may calculate the values of c, d by Least Square Sense as follows:

$$(c, d) = \arg\min_{(c,d)} \int (f_3(x) - f_2(x))^2 dx,$$

or calculate the values of c, d by other known or self-defined algorithms (e.g. Minimax Method). Once the coefficients have been found, if the asking end asks for a target parameter $f_2(x_k)$, the parameter calculating circuit 120 can find a parameter $f_1(x_k)$ through addition/subtraction calculation as it is discussed before and then the operation circuit 210 can obtain the target parameter $f_2(x_k) \approx f_3(x_k) = c \cdot f_1(x_k)+d$ according to the correlation $f_3(x)=c\cdot f_1(x)+d$ and the parameter $f_1(x_k)$.

In some applications the correlation between the target polynomial and the N degree polynomial is already known, and thus the operation circuit 210 here need not calculate the coefficient(s) of the correlation, but needs to calculate the target parameter in accordance with the correlation and the parameter from the parameter calculating circuit 120. For instance, if the N degree polynomial $f_1(x)$ stands for a characteristic curve reflecting the matching relation between the internal resistance R of an IC and the impedance Z of a signal transmission cable (e.g. the characteristic curve showing the relation between the peak value of a rebounding wave and the arrival time of the rebounding wave) while the target polynomial $f_2(x)$ stands for the mismatch relation between the IC internal resistance R and the transmission cable impedance Z, since the voltage of the cable is supposed to be a half of the output voltage V of an operational amplifier in a digital-to-analog converter (DAC OP) under the matching relation and supposed to be $(Z\cdot V)/(R+Z)$ under the mismatch relation, the correlation between the target polynomial $f_2(x)$ and the N degree polynomial $f_1(x)$ can be known or determined as $f_2(x)=2Z/(R+Z)\cdot f_1(x)$ in advance based on the voltage ratio of the two voltages. Consequently, since the correlation, the internal resistance R and the output voltage V of the DAC OP can be known or determined in advance while the impedance Z can be obtained by measuring the cable voltage $(Z\cdot V)/(R+Z)$, if an asking end asks for a target parameter $f_2(x_k)$, the operation circuit 210 can give it the target parameter $f_2(x_k)$ through the calculation of $f_2(x_k)=[2Z/(R+Z)]\cdot f_1(x_k)$ in accordance with the correlation and the parameter $f_1(x_k)$ derived by the parameter calculating circuit 120.

Figure 3A:
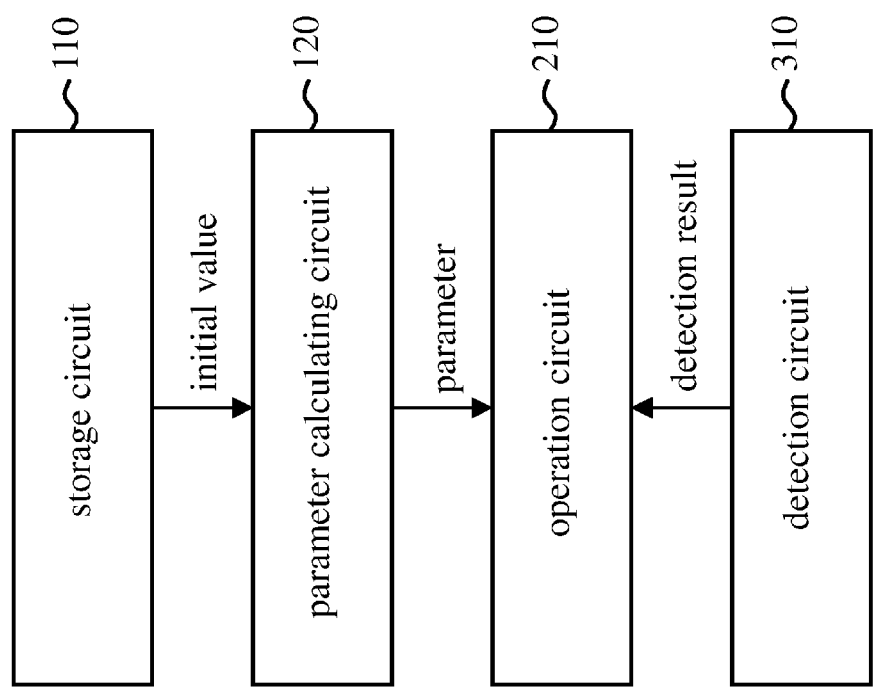
FIGS. 3a, 3b and 3c illustrate several embodiments of the parameter generating device of the present invention.
Figure 3B:
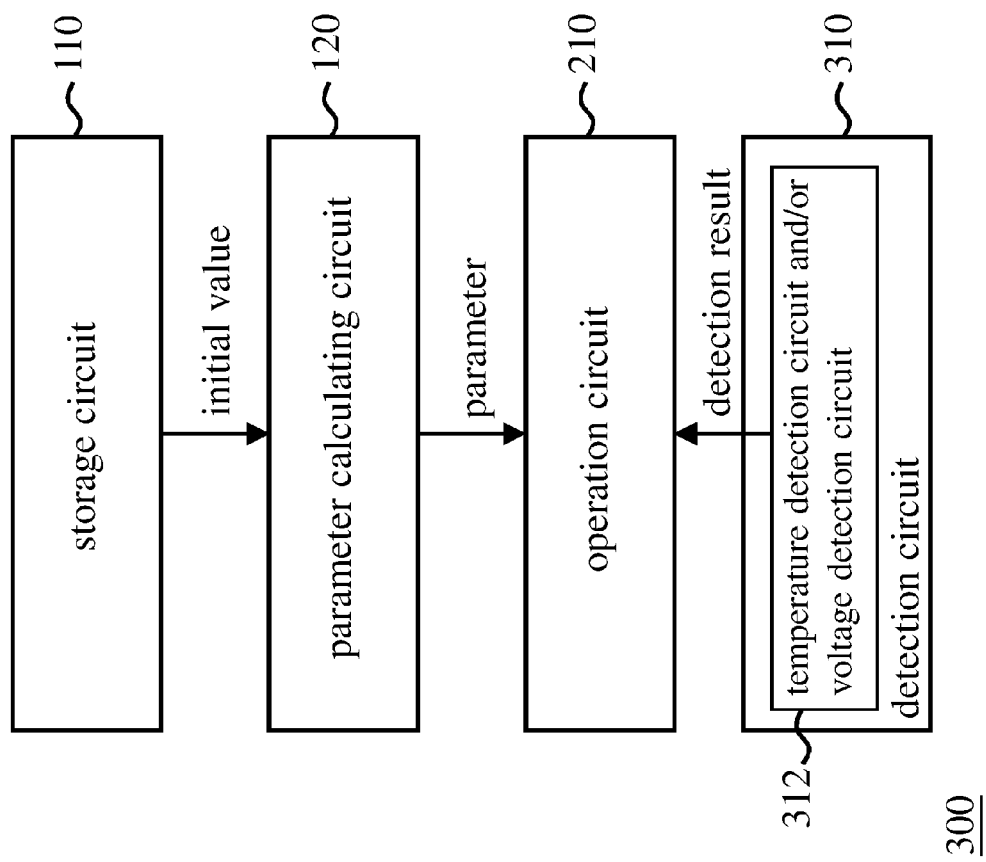
Figure 3C:
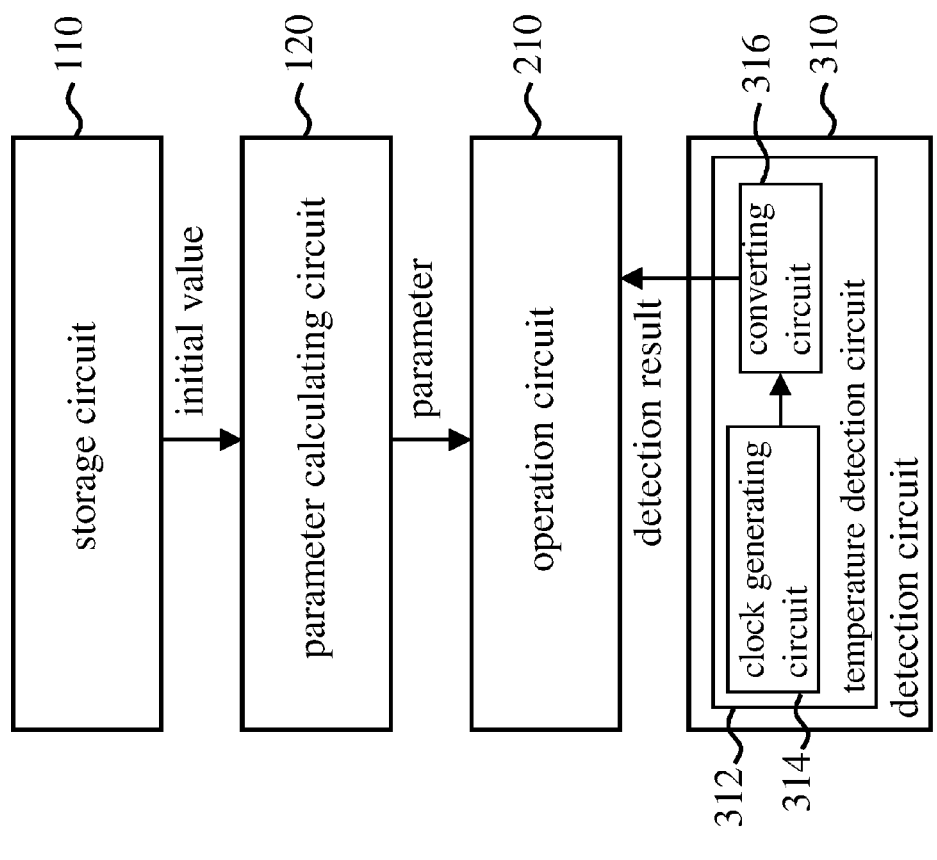

In addition to the above-mentioned scenario, there is another scenario that the correlation between the target polynomial and the N degree polynomial is already known, but at least one coefficient of the correlation is associated with a variable (e.g. temperature) and will change with the variable. In this scenario, although the operation circuit 210 need not calculate the coefficient(s) of the correlation, it still needs to determine the current value of at least one coefficient according to the variable, so as to accurately calculate the target parameter in accordance with the correlation and the parameter from the parameter calculating circuit 120. Accordingly, the present invention further discloses a parameter generating device 300 as shown in FIG. 3. Compared with FIG. 2, the parameter generating device 300 further comprises: a detection circuit 310 operable to detect a variable and thereby generate a detection result which is equal to or used to derive the aforementioned at least one coefficient. For instance, if the N degree polynomial $f_1(x)$ stands for the characteristic curve indicating the relation between the peak value of a rebounding wave and the arrival time of the rebounding wave under a temperature $T_0$ and the target polynomial $f_2(x)$ stands for such characteristic curve under a temperature T, since the correlation between the two polynomials is already known as $f_2(x)=f_1(k(T)\cdot x)$ in which $k(T)$ is a known function (e.g. $k(T)=1+\lambda(T-T_0)$, wherein $\lambda$ is a known constant) and T is the environment temperature, the detection circuit 310 can detect the temperature T and provide the detection result for the operation circuit 210, and the operation circuit 210 can determine the coefficient(s) of the correlation according to the detection result and then calculate a target parameter $f_2(x_k)=f_1(k(T)\cdot x_k)$ based on the correlation and the parameter from the parameter calculating circuit 120. Please note that as it is shown in FIG. 3b, in this embodiment the detection circuit 310 is a temperature detection circuit 312; however, the detection circuit 310 may be other types of detection circuits (e.g. a voltage detection circuit 312) or include different kinds of detection circuits (e.g. temperature and voltage detection circuits 312) in view of its application. Besides, said temperature detection circuit 312 could be a thermal sensor or some circuit capable of reflecting temperature; for instance, as it is shown in FIG. 3c, the temperature detection circuit 312 may include: a clock generating circuit 314 operable to generate a clock; and a converting circuit 316 operable to generate said detection result according to the clock and a pre-stored relation between the clock and temperature.

Figure 4:
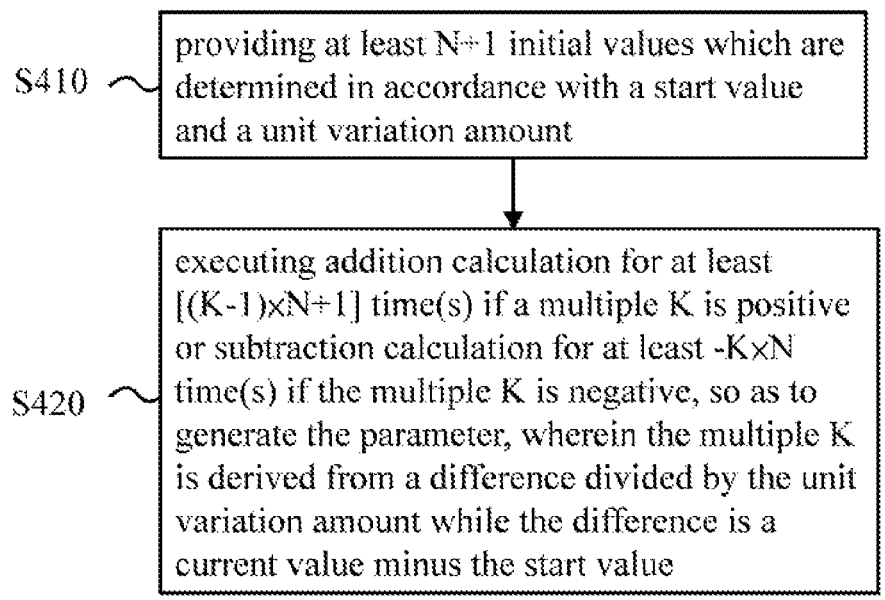
FIG. 4 illustrates an embodiment of the parameter generating method of the present invention.

In addition to the above-disclosed device invention, the present invention also discloses a parameter generating method carried out by the device of the present invention or the equivalent thereof and operable to generate a parameter for circuit operation in which the parameter is associated with an N degree polynomial of a characteristic curve while the N is a positive integer. Please refer to FIG. 4, an embodiment of the parameter generating method comprises the following steps:

Step S410: providing at least N+1 initial values which are determined in accordance with a start value and a unit variation amount. In this embodiment, the N+1 initial values comply with a sequence such as the queue order of the four initial values 4, 16, 30, 6 in table 1.

Step S420: executing addition calculation for at least $[(K-1)\times N+1]$ time(s) if a multiple K is positive or subtraction calculation for at least $-K\times N$ time(s) if the multiple K is negative, so as to generate the parameter, wherein the multiple K is derived from a difference divided by the unit variation amount while the difference is a current value minus the start value.

In light of the above, if the multiple K is equal to or more than 1, step S420 includes: a calculation of adding a $M^{th}$ and a $(M+1)^{th}$ initial values among the N+1 initial values up according to the sequence of the N+1 initial values in which the M is a positive integer less than the N. Furthermore, if the multiple K is equal to or more than 2, step S420 includes: executing addition calculation for N times to generate N first addition values and then executing addition calculation for [(K−2)×N+1] time(s) according to the N first addition values and a (N+1)$^{th}$ initial value of the N+1 initial values, so as to generate the parameter. More specifically, the step of generating the N first addition values includes: adding any adjacent two of the N+1 initial values according to said sequence to generate the N first addition values which also comply with the sequence. Afterwards, these first additional values and the (N+1)$^{th}$ initial value can be used to generate the parameter. Moreover, if the multiple K is equal to or more than 3, the step of executing addition calculation for [(K−2)×N+1] time(s) includes: adding any adjacent two of the N first addition values according to the sequence and adding a N$^{th}$ first addition value of the N first addition values and the (N+1)$^{th}$ initial value up, so as to generate N second addition values; and then executing addition calculation for [(K−3)×N+1] time(s) according to the N second addition values and the (N+1)$^{th}$ initial value to thereby generate the wanted parameter. As to the examples with the multiple K equal to or more than 4, those can be derived according to the above-described examples.

On the other hand, if the multiple K is equal to or less than −1, step S420 includes: a calculation of subtracting a (N+1)$^{th}$ initial value of the N+1 initial values from a N$^{th}$ initial value of the N+1 initial values according to the sequence of the N+1 initial values. Furthermore, if the multiple K is equal to or less than −2, step S420 includes: executing subtraction calculation for N times to generate N first subtraction values which also comply with the sequence and then executing subtraction calculation for (−K−1)×N time(s) according to the N first subtraction values and the (N+1)$^{th}$ initial value, so as to generate the wanted parameter. More specifically, the step of generating the first subtraction values includes: subtracting the (N+1)$^{th}$ initial value from the N$^{th}$ initial value to generate a N$^{th}$ first subtraction value of the N first subtraction values; and then subtracting a (M+1)$^{th}$ first subtraction value of the N first subtraction values from a M$^{th}$ initial value of the N+1 initial values according to an integer M varying from N−1 to 1 to thereby generate the rest of the first subtraction values. Moreover, if the multiple K is equal to or less than −3, the step of executing subtraction calculation for (−K−1)×N time(s) includes: subtracting the (N+1)$^{th}$ initial value from the N$^{th}$ first subtraction value to thereby generate a N$^{th}$ second subtraction value of N second subtraction values which also comply with the sequence, then subtracting a (M+1)$^{th}$ second subtraction value of the N second subtraction values from a M$^{th}$ first subtraction value of the N first subtraction values according to the integer M from N−1 to 1 to thereby generate the rest of the N second subtraction values, and afterwards executing subtraction calculation for (−K−2)×N time(s) according to the N second subtraction values and the (N+1)$^{th}$ initial value to generate the parameter. As to the examples with the multiple K equal to or less than −4, those can be derived according to the above-described examples.

Figure 5:
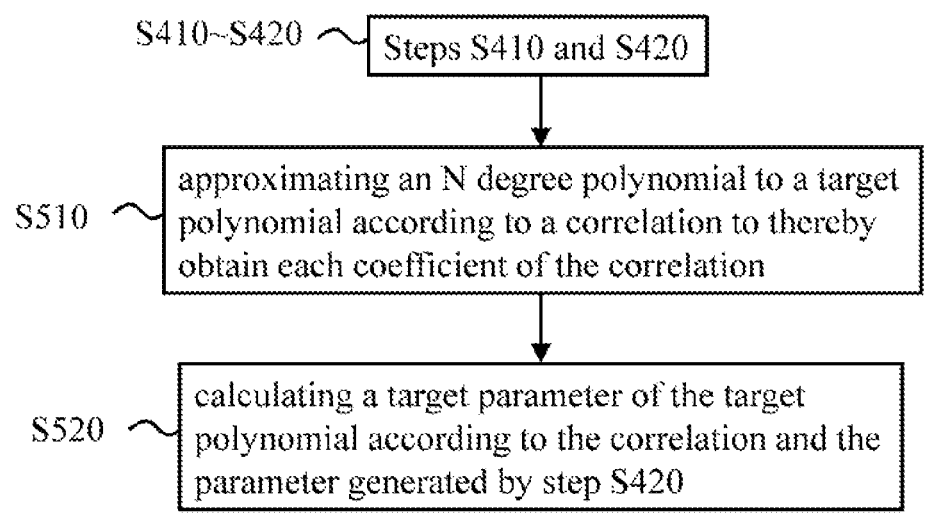
FIG. 5 illustrates another embodiment of the parameter generating method of the present invention.

Please refer to FIG. 5 which illustrates another embodiment of the parameter generating method of the present invention. This embodiment can derive a parameter of a target polynomial according to N+1 initial values of an already known N degree polynomial. To be more specific. The present embodiment in comparison with the embodiment of FIG. 4 further comprises:

Step S510: approximating an N degree polynomial to a target polynomial according to a correlation to thereby obtain each coefficient of the correlation. In this embodiment, the correlation is a hypothetical equation and thus step S510 has to derive each coefficient of the correlation; however, in some applications the correlation is already known, and then step S510 is no more necessary.

Step S520: calculating a target parameter of the target polynomial according to the correlation and the parameter generated by step S420.

Figure 6:
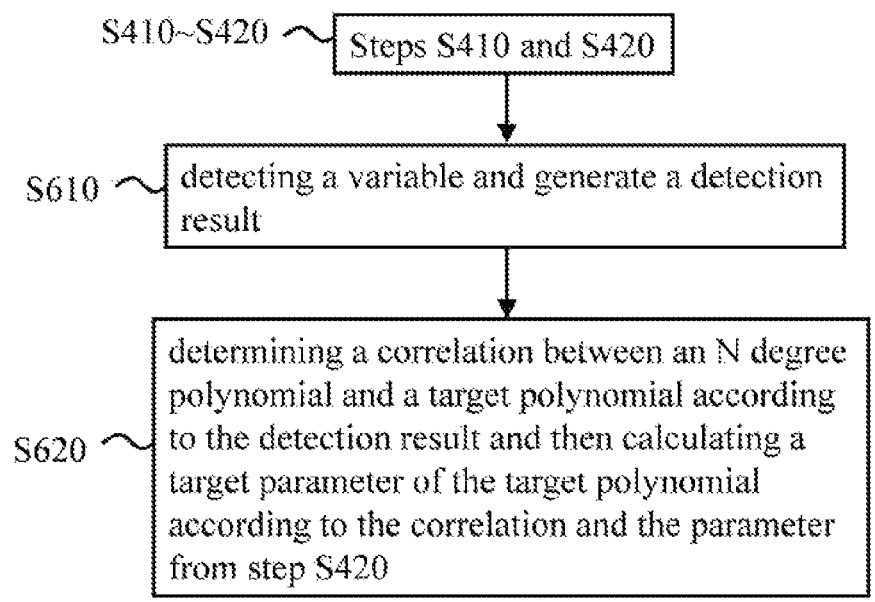
FIG. 6 illustrates a further embodiment of the parameter generating method of the present invention.

Please refer to FIG. 6 which illustrates a further embodiment of the parameter generating method of the present invention. Compared with FIG. 5, this embodiment determines at least one coefficient of said correlation by detecting a variable, so as to determine the update of the correlation and thereby generate the aforementioned target parameter. More specifically, in addition to steps S410 and S420, this embodiment further comprises:

Step S610: detecting a variable and generate a detection result. In this embodiment, the variable includes at least one of a temperature value and a voltage value. If the variable includes the temperature value, step S610 could be done through any known or self-defined temperature detection manner or through the following steps: generating a clock; and generating the detection result according to the clock and a relation between the clock and temperature.

Step S620: determining a correlation between an N degree polynomial and a target polynomial according to the detection result and then calculating a target parameter of the target polynomial according to the correlation and the parameter from step S420.

Since those of ordinary skill in the art can appreciate the implementation detail and modification thereto of the method invention by referring to the disclosure of the fore-described device invention, repeated and redundant description is therefore omitted provided that the remaining disclosure is still enough for understanding and enablement. Please note that the addition or subtraction calculation in this specification is the calculation of adding two values up or subtraction one value from another, which means that several times of addition or subtraction calculation could be summarized in a single calculation. Therefore, any single calculation that can be divided into several times of calculation also falls within the scope of the aforementioned calculation for several times. Besides, the shape, size, and ratio of any element and the step sequence of any flow chart in the disclosed figures are just exemplary for understanding, not for limiting the scope of this invention. Furthermore, each embodiment in the following description includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

In summary, the parameter generating device and method have at least the following advantages: first, only a few initial values, a start value and a unit variation amount need to be stored, which requires no enormous storage space, and the circuit area and cost are thereby saved; second, parameter(s) can be generated through simple addition or subtraction calculation instead of complicated calculation; third, the generated parameter is quite accurate, i.e. the less the unit variation amount, the higher the accuracy of the generated parameter; fourth, the parameter of another polynomial can be derived from the initial values of the existing polynomial through addition or subtraction calculation, which consequently saves more parameter storage space and makes more applications possible.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A parameter generating device operable to generate a parameter for circuit operation, in which the parameter is associated with an N degree polynomial of a characteristic curve while the N is a positive integer and the parameter is based on a physical condition, the parameter generating device comprising:
    a storage circuit operable to store at least N+1 initial values which are determined in accordance with a start value and a unit variation amount;
    a parameter calculating circuit, coupled to the storage circuit, operable to carry out addition calculation for at least [(K−1)×N+1] time(s) if a multiple K is positive or subtraction calculation for at least −K×N time(s) if the multiple K is negative, so as to generate the parameter; and
    an operation circuit, coupled with the parameter calculating circuit, operable to calculate a target parameter of a target polynomial according to the parameter and a correlation between the N degree polynomial and the target polynomial,
    wherein the multiple K is derived from a difference divided by the unit variation amount while the difference is a current value minus the start value.

2. The parameter generating device of claim 1, wherein the N+1 initial values comply with a sequence; and the addition calculation includes a calculation of adding a $M^{th}$ and a $(M+1)^{th}$ initial values of the N+1 initial values up according to the sequence in which the M is a positive integer less than the N, or the subtraction calculation includes a calculation of subtracting a $(N+1)^{th}$ initial value of the N+1 initial values from a $N^{th}$ initial value of the N+1 initial values according to the sequence.

3. The parameter generating device of claim 1, wherein if the multiple K is equal to or more than 2, the parameter calculating circuit carries out first addition calculation of the addition calculation for N times to generate N first addition values and then carries out second addition calculation of the addition calculation for [(K−2)×N+1] time(s) according to the N first addition values and a $(N+1)^{th}$ initial value of the N+1 initial values, so as to generate the parameter; or if the multiple K is equal to or less than −2, the parameter calculating circuit carries out first subtraction calculation of the subtraction calculation for N times to generate N first subtraction values and then carries out second subtraction calculation of the subtraction calculation for (−K−1)×N time(s) according to the N first subtraction values and the $(N+1)^{th}$ initial value, so as to generate the parameter.

4. The parameter generating device of claim 3, wherein the N+1 initial values comply with a sequence; and the parameter calculating circuit adds any adjacent two of the N+1 initial values up according to the sequence to thereby generate the N first addition values, or the parameter calculating circuit subtracts the $(N+1)^{th}$ initial value from a $N^{th}$ initial value of the N+1 initial values to thereby generate a $N^{th}$ first subtraction value of the N first subtraction values and then subtracts a $(M+1)^{th}$ first subtraction value of the N first subtraction values from a $M^{th}$ initial value of the N+1 initial values to thereby generate the rest of the N first subtraction values in which the M is an integer from N−1 to 1 and the N first subtraction values also comply with the sequence.

5. The parameter generating device of claim 4, wherein the N first addition values comply with the sequence, and
    if the multiple K is equal to or more than 3, the parameter calculating circuit carries out third addition calculation of the second addition calculation to add any adjacent two of the N first addition values according to the sequence and add a $N^{th}$ first addition value of the N first addition values and the $(N+1)^{th}$ initial value up for generating N second addition values, and then the parameter calculating circuit executes fourth addition calculation of the second addition calculation for [(K−3)×N+1] time(s) according to the N second addition values and the $(N+1)^{th}$ initial value to thereby generate the parameter; or
    the N first subtraction values comply with the sequence, and if the multiple K is equal to or less than −3, the parameter calculating circuit carries out third subtraction calculation of the second subtraction calculation to subtract the $(N+1)^{th}$ initial value from the $N^{th}$ first subtraction value for generating a $N^{th}$ second subtraction value of N second subtraction values which also comply with the sequence and then subtract a $(M+1)^{th}$ second subtraction value of the N second subtraction values from a $M^{th}$ first subtraction value of the N first subtraction values for generating the rest of the N second subtraction values, and afterwards the parameter calculating circuit executes fourth subtraction calculation of the second subtraction calculation for (−K−2)×N time(s) according to the N second subtraction values and the $(N+1)^{th}$ initial value to generate the parameter.

6. A parameter generating device operable to generate a parameter for circuit operation, in which the parameter is associated with an N degree polynomial of a characteristic curve while the N is a positive integer and the parameter is based on a physical condition, the parameter generating device comprising:
    a storage circuit operable to store at least N+1 initial values which are determined in accordance with a start value and a unit variation amount;
    a parameter calculating circuit, coupled to the storage circuit, operable to carry out addition calculation for at least [(K−1)×N+1] time(s) if a multiple K is positive or subtraction calculation for at least −K×N time(s) if the multiple K is negative, so as to generate the parameter;
    a detection circuit operable to detect a variable and generate a detection result; and
    an operation circuit, coupled with the parameter calculating circuit and the detection circuit, operable to determine a correlation between the N degree polynomial and a target polynomial according to the detection result and then calculate a target parameter of the target polynomial according to the correlation and the parameter.

7. The parameter generating device of claim 6, wherein the detection circuit includes at least one of a temperature detection circuit and a voltage detection circuit.

8. The parameter generating device of claim 6, wherein the detection circuit includes:
   a clock generating circuit operable to generate a clock; and
   a converting circuit operable to generate the detection result according to the clock and a relation between the clock and temperature.

9. A parameter generating method carried out by a parameter generating device and operable to generate a parameter for circuit operation, in which the parameter is associated with an N degree polynomial of a characteristic curve while the N is a positive integer and the parameter is based on a physical condition, the parameter generating method comprising the following steps:
   providing at least N+1 initial values by a storage circuit, in which the at least N+1 initial values are determined in accordance with a start value and a unit variation amount;
   executing addition calculation for at least [(K−1)×N+1] time(s) by a parameter calculating circuit if a multiple K is positive or executing subtraction calculation for at least −K×N time(s) by the parameter calculating circuit if the multiple K is negative, so as to generate the parameter;
   approximating the N degree polynomial to a target polynomial according to a correlation by an operation circuit to thereby obtain each coefficient of the correlation; and
   calculating a target parameter of the target polynomial according to the correlation and the parameter by the operation circuit,
   wherein the multiple K is derived from a difference divided by the unit variation amount while the difference is a current value minus the start value.

10. The parameter generating method of claim 9, wherein the N+1 initial values comply with a sequence; and the addition calculation includes a calculation of adding a $M^{th}$ and a $(M+1)^{th}$ initial values of the N+1 initial values up according to the sequence in which the M is a positive integer less than the N, or the subtraction calculation includes a calculation of subtracting a $(N+1)^{th}$ initial value of the N+1 initial values from a $N^{th}$ initial value of the N+1 initial values according to the sequence.

11. The parameter generating method of claim 9, wherein if the multiple K is equal to or more than 2, the step of executing addition calculation includes: executing addition calculation for N times to generate N first addition values and then executing addition calculation for [(K−2)×N+1] time(s) according to the N first addition values and a $(N+1)^{th}$ initial value of the N+1 initial values, so as to generate the parameter; or if the multiple K is equal to or less than −2, the step of executing subtraction calculation includes: executing subtraction calculation for N times to generate N first subtraction values and then executing subtraction calculation for (−K−1)×N time(s) according to the N first subtraction values and the $(N+1)^{th}$ initial value, so as to generate the parameter.

12. The parameter generating method of claim 11, wherein the N+1 initial values comply with a sequence; and the step of generating the N first addition values includes: adding any adjacent two of the N+1 initial values up according to the sequence to thereby generate the N first addition values, or the step of generating the N first subtraction values includes: subtracting the $(N+1)^{th}$ initial value from a $N^{th}$ initial value of the N+1 initial values to thereby generate a $N^{th}$ first subtraction value of the N first subtraction values and then subtracting a $(M+1)^{th}$ first subtraction value of the N first subtraction values from a $M^{th}$ initial value of the N+1 initial values to thereby generate the rest of the N first subtraction values in which the M is an integer from N−1 to 1 and the N first subtraction values also comply with the sequence.

13. The parameter generating method of claim 12, wherein
   the N first addition values comply with the sequence, and if the multiple K is equal to or more than 3, the step of executing addition calculation includes: adding any adjacent two of the N first addition values according to the sequence and adds a $N^{th}$ first addition value of the N first addition values and the $(N+1)^{th}$ initial value up to generate N second addition values, and then executing addition calculation for [(K−3)×N+1] time(s) according to the N second addition values and the $(N+1)^{th}$ initial value to thereby generate the parameter; or
   the N first subtraction values comply with the sequence, and if the multiple K is equal to or less than −3, the step of executing subtraction calculation includes: subtracting the $(N+1)^{th}$ initial value from the $N^{th}$ first subtraction value to thereby generate a $N^{th}$ second subtraction value of N second subtraction values which also comply with the sequence, then subtracting a $(M+1)^{th}$ second subtraction value of the N second subtraction values from a $M^{th}$ first subtraction value of the N first subtraction values to thereby generate the rest of the N second subtraction values, and afterwards executing subtraction calculation for (−K−2)×N time(s) according to the N second subtraction values and the $(N+1)^{th}$ initial value to generate the parameter.

14. The parameter generating method of claim 9, further comprising:
   detecting a variable and generating a detection result; and
   determining the correlation between the N degree polynomial and the target polynomial according to the detection result.

15. The parameter generating method of claim 14, wherein the variable includes at least one of a temperature value and a voltage value.

16. The parameter generating method of claim 14, wherein the step of generating the detection result includes:
   generating a clock; and
   generating the detection result according to the clock and a relation between the clock and temperature.

* * * * *